(12) United States Patent
Hong (10) Patent No.: US 11,961,406 B2
(45) Date of Patent: Apr. 16, 2024

(54) METHOD AND DEVICE FOR TRANSMITTING FLIGHT INFORMATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 485 days.

(21) Appl. No.: 17/266,554

(22) PCT Filed: Aug. 7, 2018

(86) PCT No.: PCT/CN2018/099175
§ 371 (c)(1),
(2) Date: Feb. 5, 2021

(87) PCT Pub. No.: WO2020/029072
PCT Pub. Date: Feb. 13, 2020

(65) Prior Publication Data
US 2021/0295711 A1    Sep. 23, 2021

(51) Int. Cl.
*G08G 5/00*        (2006.01)
*B64C 39/02*       (2023.01)
(Continued)

(52) U.S. Cl.
CPC .......... *G08G 5/003* (2013.01); *B64C 39/024* (2013.01); *G05D 1/0022* (2013.01);
(Continued)

(58) Field of Classification Search
CPC ...... G08G 5/003; G08G 5/0013; G08G 5/006; G08G 5/0069; G08G 5/0026;
(Continued)

(56) References Cited

U.S. PATENT DOCUMENTS

| 2016/0300492 A1 | 10/2016 | Pasko et al. |
| 2017/0311290 A1 | 10/2017 | Adjakple et al. |
| 2021/0201685 A1* | 7/2021 | Han ............ G08G 5/0026 |

FOREIGN PATENT DOCUMENTS

| CN | 104053197 A | 9/2014 |
| CN | 107205225 A | 9/2017 |

(Continued)

OTHER PUBLICATIONS

International Search Report of PCT Application No. PCT/CN2018/099175 dated Feb. 13, 2019 with English translation (4p).
(Continued)

*Primary Examiner* — Shon G Foley
(74) *Attorney, Agent, or Firm* — Arch & Lake LLP (57) ABSTRACT

A method and device for transmitting flight information. The method comprises: generating switching request related signaling, the switching request related signaling carrying flight path information of an unmanned aerial vehicle; and sending the switching request related signaling to a target base station. The method may also be a method applied to an MME side, and comprises: receiving switching demand signaling sent by a source base station, the switching demand signaling carrying flight path information of an unmanned aerial vehicle; and sending second switching request signaling to a target base station, the second switching request signaling carrying flight path information of an unmanned aerial vehicle.

10 Claims, 4 Drawing Sheets

```
┌─────────────────────────────────────────────┐ ── 301
│  Generating handover required signaling,    │
│  the handover required signaling carrying   │
│  flight path related information of an      │
│  unmanned aerial vehicle                    │
└─────────────────────────────────────────────┘
                    │
                    ▼
┌─────────────────────────────────────────────┐ ── 302
│  Sending the handover required signaling    │
│  to an MME through an S1 interface, and     │
│  instructing the MME to send second         │
│  handover request signaling to the target   │
│  base station, the second handover request  │
│  signaling carrying the flight path related │
│  information of the unmanned aerial vehicle │
└─────────────────────────────────────────────┘
```

(51) Int. Cl.
*G05D 1/00* (2006.01)
*H04W 84/02* (2009.01)
*B64U 101/00* (2023.01)

(52) U.S. Cl.
CPC ........... *G08G 5/0013* (2013.01); *G08G 5/006* (2013.01); *H04W 84/02* (2013.01); *B64U 2101/00* (2023.01)

(58) Field of Classification Search
CPC .. G08G 5/0034; G08G 5/0043; G08G 5/0082; B64C 39/024; B64U 70/00; B64U 10/13; B64U 2201/00; H04B 7/18506
See application file for complete search history.

(56) References Cited

FOREIGN PATENT DOCUMENTS

| | | | | |
|---|---|---|---|---|
| CN | 108064360 | A | 5/2018 | |
| CN | 108064465 | A | 5/2018 | |
| CN | 108886668 | A | 11/2018 | |
| EP | 2278732 | A2 * | 1/2011 | ......... H04B 7/18506 |

OTHER PUBLICATIONS

Written Opinion of the International Search Authority in the International Application No. PCT/CN2018/099175, dated Feb. 13, 2019 and English translation, (5p).
First Office Action of the Chinese Application No. 201880002301.4, dated Jul. 16, 2020, with English translation, (20p).
Notice of Allowance of the Chinese application No. 201880002301.4, dated Feb. 20, 2021 with English translation, (5p).
Nokia, "Mobility enhancements for UAVs—planned flight route", 3GPP TSG-RAN WG2 Meeting #101, R2-1803348, Athens, Greece, Feb. 26-Mar. 2, 2018, (3p).
Zte, "S1/X2 Signaling Support of UAV Subscription Information", 3GPP TSG-RAN WG3 #99bis, R3-181664, Sanya, China, Apr. 16-20, 2018, (7p).
Fraunhofer HHI, "Flight Path Information Report: Trigger and Content", 3GPP TSG-WG2 Meeting #102, R2-1807212, Busan, Korea, May 21-25, 2018, (5p).
Huawei, "Report of email discussion [101bis#57][LTE/UAV] Flight path information", 3GPP TSG-RAN WG2 #102, R2-1807475, Busan, Korea, May 21-25, 2018, (9p).

* cited by examiner

METHOD AND DEVICE FOR TRANSMITTING FLIGHT INFORMATION

CROSS-REFERENCE TO RELATED APPLICATION

This application is the U.S. national phase application of International Application No. PCT/CN2018/099175, filed on Jul. 8, 2018, the entire content of which is incorporated herein by reference for all purposes.

TECHNICAL FIELD

The present disclosure relates to the field of communication technology, and in particular relates to a method and device for transmitting flight information.

BACKGROUND

With the development of science and technology, unmanned aerial vehicles have gradually shifted from military to civilian use. Unmanned aerial vehicles are no longer short-distance remote control aircrafts, but can fly a long distance according to pre-set routes. Industry insiders have proposed that mobile cellular networks can provide services for unmanned aerial vehicles. However, there is no effective solution for what kind of service to provide and how to provide the service. The premise of providing services is that the network side can obtain flight information, but there is no effective solution for how to obtain flight information.

SUMMARY

The present disclosure provides a method and device for transmitting flight information.

According to a first aspect of the present disclosure, there is provided a method for transmitting flight information. The method includes that: generating handover request related signaling, wherein the handover request related signaling comprises flight path information of an unmanned aerial vehicle; and sending the handover request related signaling to a target base station.

According to a second aspect of the present disclosure, a method for transmitting flight information is provided. The method includes that: receiving handover required signaling sent by a source base station, wherein the handover required signaling comprises flight path information of an unmanned aerial vehicle; and sending second handover request signaling to a target base station, wherein the second handover request signaling comprises the flight path information of the unmanned aerial vehicle.

According to a third aspect of the present disclosure, a device for transmitting flight information is provided. The device includes: a processor; and a memory for storing instructions executable by the processor; wherein the processor is configured to: generate handover request related signaling, wherein the handover request related signaling comprises flight path information of an unmanned aerial vehicle; and send the handover request related signaling to a target base station.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to examples of the present disclosure, which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure as recited in the appended claims.

In the related art, industry insiders have proposed that mobile cellular networks may provide services for unmanned aerial vehicles. However, there is no effective solution for what kind of service to provide and how to provide the service.

The inventor of the present disclosure found that the basis of providing services is that a base station needs to know the flight path information of an unmanned aerial vehicle, so that the base station can better plan a home cell for the unmanned aerial vehicle according to the flight path, which provides a reference for selecting a target cell. The base station may also provide other services for an unmanned aerial vehicle based on the flight path information, which are not listed here. Therefore, how to obtain the flight path information of an unmanned aerial vehicle is an urgent problem to be solved.

In order to solve the above-mentioned problems, in the present example, during the handover process, a source base station sends flight path information to a target base station, to increase an information source for the target base station to obtain flight path information, thereby facilitating the target base station to obtain the flight path of an unmanned aerial vehicle, and better providing services for the unmanned aerial vehicle.

Figure 1:
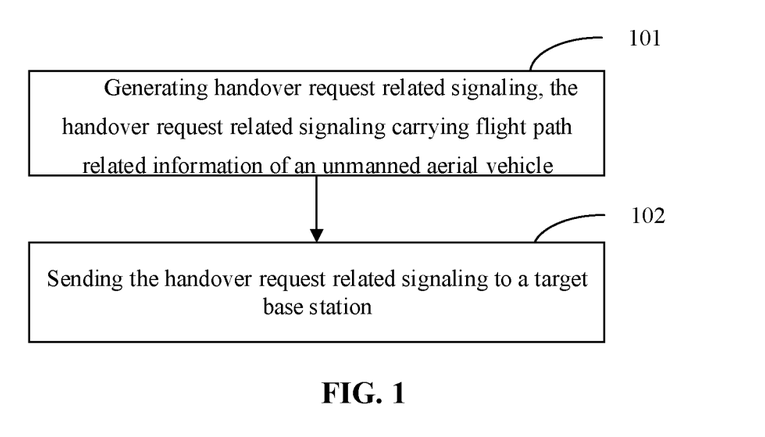
FIG. 1 is a flow chart showing a method for transmitting flight information according to an example of the preset disclosure.

FIG. 1 is a flow chart showing a method for transmitting flight information according to an example of the present disclosure. The method for transmitting flight information is used in access network equipment such as a base station. As illustrated in FIG. 1, the method includes the following operations at block 101-102.

At block 101, handover request related signaling is generated, the handover request related signaling carrying flight path related information of an unmanned aerial vehicle.

At block 102, the handover request related signaling is sent to a target base station.

In the present example, during the handover process, flight path related information may be sent from a source base station to a target base station, so that the target base station better plans a cell for an unmanned aerial vehicle and other user equipment according to flight path related information, or provides other services for the unmanned aerial vehicle. The target base station may obtain the flight path related information more timely. For example, the flight path related information includes the number of flight path points, flight path point information, etc.

The target base station may receive and parse the handover request related signaling to obtain the flight path related information. The target base station may obtain the flight path related information from the source base station, and the source base station is used as an information source for obtaining the flight path related information, so that the target base station may obtain the flight path related information in time.

In one example, the handover request related signaling includes first handover request signaling; and the operation at block 102 includes step A.

In the step A, the first handover request signaling is sent to a target base station through an X2 interface (an interface between two base stations).

In the present example, if the source base station and the target base station have X2 interfaces, the first handover request signaling can be transmitted through the X2 interface. The present example improves the first handover request signaling, so that the first handover request signaling can carry flight path related information, and transmission of the flight path related information during the handover process is realized.

In one example, an RRC context information element in the first handover request signaling carries flight path related information of an unmanned aerial vehicle.

The present example uses the RRC context information element (IE) in the first handover request signaling to carry the flight path related information, which provides a feasible solution for carrying the flight path related information.

In one example, the handover preparation information signaling in the RRC context information element carries flight path related information of an unmanned aerial vehicle.

The present example further improves the RRC context information element, uses the handover preparation information signaling therein to carry flight path related information, which provides a feasible solution for carrying the flight path related information.

In one example, access stratum context signaling in the handover preparation information signaling carries flight path related information of an unmanned aerial vehicle.

The present example further improves the handover preparation information signaling, uses the access stratum context (AS-context) signaling therein to carry flight path related information, which provides a feasible solution for carrying the flight path related information.

An example of the access stratum context signaling is shown as follows:

```
-- ASN1START
AS-Context ::=                          SEQUENCE {
    reestablishmentInfo                     ReestablishmentInfo
OPTIONAL -- Cond HO
}
AS-Context-v1130 ::=                    SEQUENCE {
    idc-Indication-r11                      OCTET STRING (CONTAINING
                                                InDeviceCoexIndication-r11) OPTIONAL,
-- Cond HO2
    mbmsInterestIndication-r11              OCTET STRING (CONTAINING
                                                MBMSInterestIndication-r11) OPTIONAL,
-- Cond HO2
    powerPrefIndication-r11                 OCTET STRING (CONTAINING
                                                UEAssistanceInformation-r11)OPTIONAL,
    -- Cond HO2
    ...,
    [[ sidelinkUEInformation-r12            OCTET STRING (CONTAINING
                                                SidelinkUEInformation-r12)
    OPTIONAL -- Cond HO2
    ]],
    [[ sourceContextENDC-r15                OCTET STRING              OPTIONAL
    -- Cond HO2
    ]]
}
AS-Context-v1320 ::=                    SEQUENCE {
    wlanConnectionStatusReport-r13          OCTET STRING (CONTAINING
                                                WLANConnectionStatusReport-r13)
    OPTIONAL -- Cond HO2
AS-Context-v1530 ::=                    SEQUENCE {
    flightPathInformation-r15               OCTET STRING (CONTAINING
                                                FlightPathInformationReport-r15)
```

OPTIONAL—Cond HO2//The present example newly adds AS-Context signaling. v1530 is the version number, and is used to indicate the newly added AS-Context signaling carrying the flight path related information of an unmanned aerial vehicle. FlightPathInformationReport-r15 is an information element for flight path information report which is newly added in the present example, and is used for carrying flight path related information. r15 is the version number, and is used to indicate the information element for flight path information report which carries flight path related information of an unmanned aerial vehicle.

}

--ASN1STOP

In one example, the handover request related signaling includes handover required signaling; and the operation at block 102 includes step B.

In step B, the handover required signaling is sent to an MME through an S1 interface (an interface between a base station and a core network), and the MME is instructed to send second handover request signaling to a target base station, the second handover request signaling carrying flight path related information of an unmanned aerial vehicle.

In the present example, if a source base station and a target base station do not have an X2 interface, forwarding may be performed through the MME. Therefore, in the present example, the handover required signaling is sent to the MME through the S1 interface, realizing that during the handover process, even if the source base station and the target base station cannot directly transmit information, the target base station can obtain flight path related information.

The present example improves the handover required signaling and the second handover request signaling, so that the handover required signaling and the second handover request signaling may carry flight path related information, and transmission of the flight path related information during the handover process is realized.

In one example, a source to target transparent container information element in the handover required signaling carries flight path related information of an unmanned aerial vehicle.

The present example uses a source to target transparent container information element in the handover required signaling to carry flight path related information, which provides a feasible solution for carrying the flight path related information.

In one example, a source to target transparent container information element in the second handover request signaling carries flight path related information of an unmanned aerial vehicle.

The present example uses a source to target transparent container information element in the second handover request signaling to carry flight path related information, which provides a feasible solution for carrying the flight path related information.

In one example, the handover preparation information signaling in the source to target transparent container information element carries flight path related information of an unmanned aerial vehicle.

The present example further improves the source to target transparent container information element, uses the handover preparation information signaling therein to carry flight path related information, which provides a feasible solution for carrying the flight path related information.

In one example, access stratum context signaling in the handover preparation information signaling carries flight path related information of an unmanned aerial vehicle.

The present example further improves the handover preparation information signaling, uses the access stratum context signaling therein to carry flight path related information, which provides a feasible solution for carrying the flight path related information.

The following describes the implementation process in detail through examples.

Figure 2:
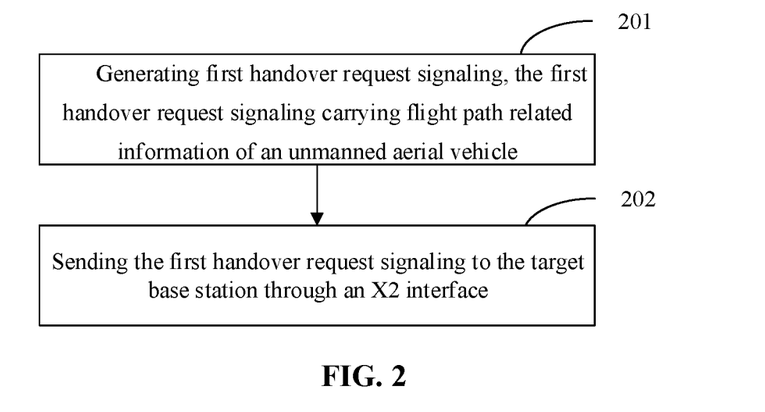
FIG. 2 is a flow chart showing a method for transmitting flight information according to an example of the preset disclosure.

FIG. 2 is a flow chart showing a method for transmitting flight information according to an example of the present disclosure. The method for transmitting flight information is used in access network equipment such as a base station. As illustrated in FIG. 2, the method includes the following operations at blocks 201-202.

At block 201, first handover request signaling is generated, the first handover request signaling carrying flight path related information of an unmanned aerial vehicle.

At block 202, the first handover request signaling is sent to a target base station through an X2 interface.

Figure 3:
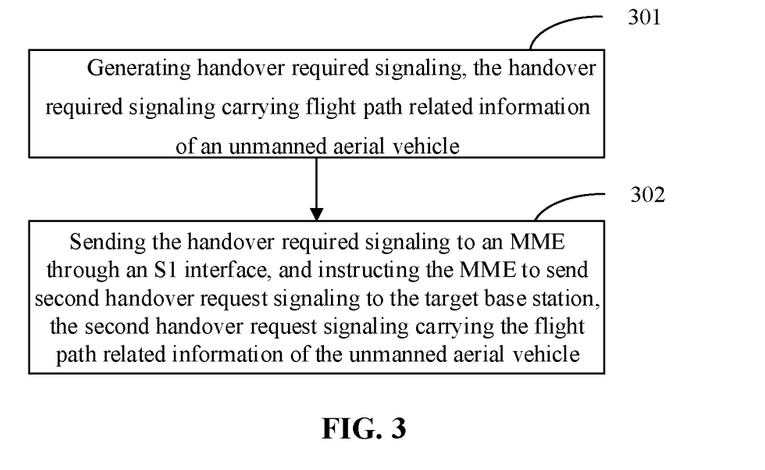
FIG. 3 is a flow chart showing a method for transmitting flight information according to an example of the preset disclosure.

FIG. 3 is a flow chart showing a method for transmitting flight information according to an example of the present disclosure. The method for transmitting flight information is used in access network equipment such as a base station. As illustrated in FIG. 3, the method includes the following operations at blocks 301-302.

At block 301, handover required signaling is generated, the handover required signaling carrying the flight path related information of the unmanned aerial vehicle.

At block 302, the handover required signaling is sent to an MME through an S1 interface, and the MME is instructed to send second handover request signaling to a target base station, the second handover request signaling carrying the flight path related information of the unmanned aerial vehicle.

The present example also improves the MME that, the MME may receive and parse handover required signaling carrying flight path related information of an unmanned aerial vehicle. Triggered by the handover required signaling, the target base station sends the second handover request signaling. Therefore, the implementation process of the MME is introduced below.

Figure 4:
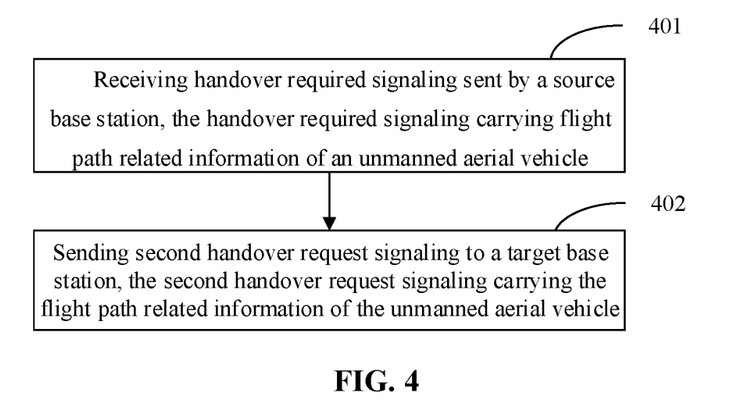
FIG. 4 is a flow chart showing a method for transmitting flight information according to an example of the preset disclosure.

FIG. 4 is a flow chart showing a method for transmitting flight information according to an example of the present disclosure. The method for transmitting flight information is used in core network equipment such as an MME. As illustrated in FIG. 4, the method includes the following operations at blocks 401-402.

At block 401, handover required signaling sent by a source base station is received, the handover required signaling carrying flight path related information of an unmanned aerial vehicle.

At block 402, second handover request signaling is sent to a target base station, the second handover request signaling carrying the flight path related information of the unmanned aerial vehicle.

In the present example, the MME may receive and parse handover required signaling carrying flight path related information of an unmanned aerial vehicle. Triggered by the handover required signaling, the target base station sends the second handover request signaling. Indirect transmission of flight path related information between a source base station and a target base station is realized, and a feasible solution is provided for indirect transmission of the flight path related information between the source base station and the target base station.

In one example, a source to target transparent container information element in the handover required signaling carries flight path related information of an unmanned aerial vehicle.

The present example uses a source to target transparent container information element in the handover required signaling to carry flight path related information, which provides a feasible solution for carrying the flight path related information.

In one example, a source to target transparent container information element in the second handover request signaling carries flight path related information of an unmanned aerial vehicle.

The present example uses a source to target transparent container information element in the second handover request signaling to carry flight path related information, which provides a feasible solution for carrying the flight path related information.

In one example, the handover preparation information signaling in the source to target transparent container information element carries flight path related information of an unmanned aerial vehicle.

The present example further improves the source to target transparent container information element, uses the handover preparation information signaling therein to carry flight path related information, which provides a feasible solution for carrying the flight path related information.

In one example, access stratum context signaling in the handover preparation information signaling carries flight path related information of an unmanned aerial vehicle.

The present example further improves the handover preparation information signaling, uses the access stratum context signaling therein to carry flight path related information, which provides a feasible solution for carrying the flight path related information.

The above examples may be freely combined according to actual needs.

The following are device examples of the present disclosure, and may be used to implement the method examples of the present disclosure.

Figure 5:
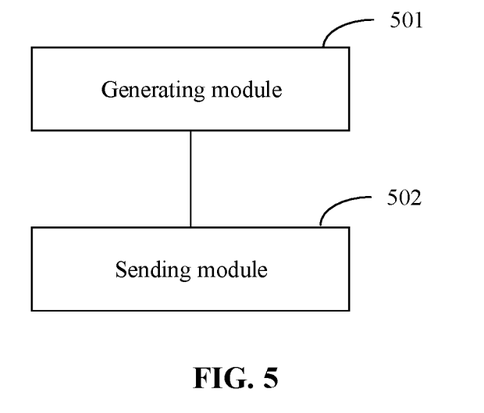
FIG. 5 is a block diagram illustrating a device for transmitting flight information according to an example of the preset disclosure.

FIG. 5 is a block diagram illustrating a device for transmitting flight information according to an example of the present disclosure. The device may be implemented as part or all of electronic equipment through software, hardware or a combination of both, and is applied to a base station. Referring to FIG. 5, the device for transmitting flight information includes a generating module 501 and a sending module 502.

The generating module 501 is configured to generate handover request related signaling, the handover request related signaling carrying flight path related information of an unmanned aerial vehicle; and The sending module 502 is configured to send the handover request related signaling to a target base station.

In one example, the handover request related signaling includes first handover request signaling.

Figure 6:
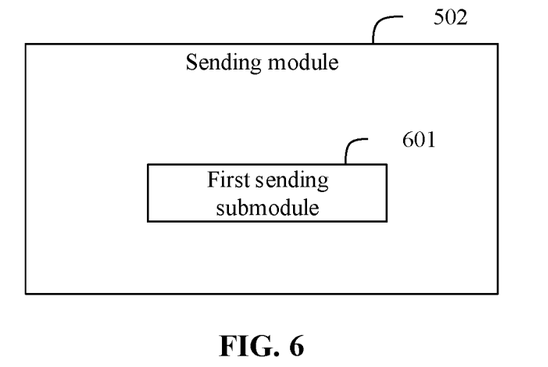
FIG. 6 is a block diagram illustrating a sending module according to an example of the preset disclosure.

As illustrated in FIG. 6, the sending module 502 includes a first sending submodule 601.

The first sending submodule 601 is configured to send the first handover request signaling to the target base station through an X2 interface.

In one example, an RRC context information element in the first handover request signaling carries flight path related information of an unmanned aerial vehicle.

In one example, the handover preparation information signaling in the RRC context information element carries flight path related information of an unmanned aerial vehicle.

In one example, access stratum context signaling in the handover preparation information signaling carries flight path related information of an unmanned aerial vehicle.

In one example, the handover request related signaling includes handover required signaling.

Figure 7:
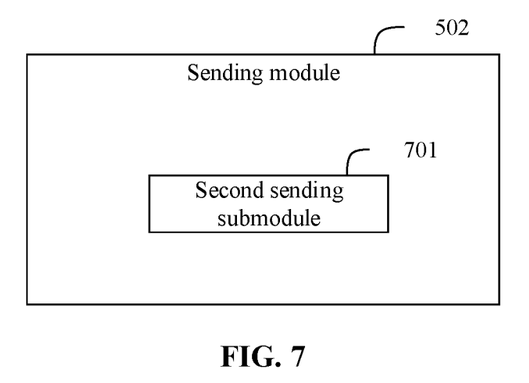
FIG. 7 is a block diagram illustrating a sending module according to an example of the preset disclosure.

As illustrated in FIG. 7, the sending module 502 includes a second sending submodule 701.

The second sending submodule 701 is configured to send the handover required signaling to an MME through an S1 interface, and instruct the MME to send second handover request signaling to a target base station, the second handover request signaling carrying flight path related information of an unmanned aerial vehicle.

In one example, a source to target transparent container information element in the handover required signaling carries flight path related information of an unmanned aerial vehicle.

In one example, a source to target transparent container information element in the second handover request signaling carries flight path related information of an unmanned aerial vehicle.

In one example, the handover preparation information signaling in the source to target transparent container information element carries flight path related information of an unmanned aerial vehicle.

In one example, access stratum context signaling in the handover preparation information signaling carries flight path related information of an unmanned aerial vehicle.

Figure 8:
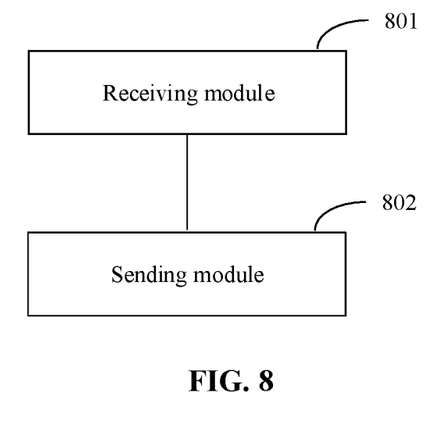
FIG. 8 is a block diagram illustrating a device for transmitting flight information according to an example of the preset disclosure.

FIG. 8 is a block diagram illustrating a device for transmitting flight information according to an example of the present disclosure. The device may be implemented as part or all of electronic equipment through software, hardware or a combination of both, and is applied to an MME. Referring to FIG. 8, the device for transmitting flight information includes a receiving module 801 and a sending module 802.

The receiving module 801 is configured to receive handover required signaling sent by a source base station, the handover required signaling carrying flight path related information of an unmanned aerial vehicle; and The sending module 802 is configured to send second handover request signaling to a target base station, the second handover request signaling carrying the flight path related information of the unmanned aerial vehicle.

In one example, a source to target transparent container information element in the handover required signaling carries flight path related information of an unmanned aerial vehicle.

In one example, a source to target transparent container information element in the second handover request signaling carries flight path related information of an unmanned aerial vehicle.

In one example, the handover preparation information signaling in the source to target transparent container information element carries flight path related information of an unmanned aerial vehicle.

In one example, access stratum context signaling in the handover preparation information signaling carries flight path related information of an unmanned aerial vehicle.

Regarding the devices in the foregoing examples, the specific manner in which each module performs operations has been described in detail in the examples of the methods, and detailed description will not be given here.

Figure 9:
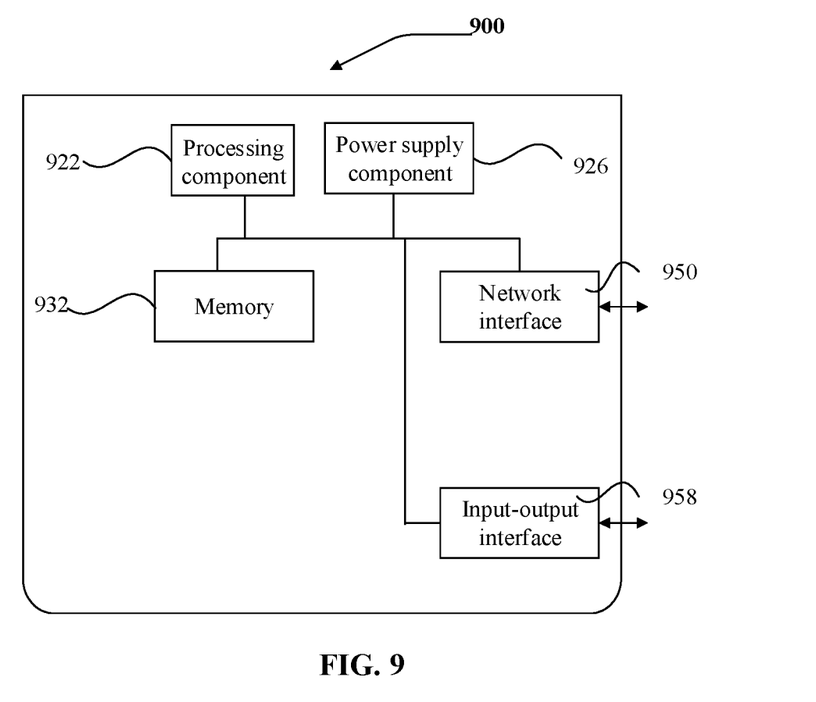
FIG. 9 is a block diagram illustrating a device suitable for transmitting flight information according to an example of the preset disclosure.

FIG. 9 is a block diagram illustrating a device 900 for synchronizing data according to an example of the present disclosure. For example, the device 900 may be provided as a computer. Referring to FIG. 9, the device 900 includes a processing component 922 which further includes one or more processors, and a memory resource represented by a memory 932, which is configured to store instructions, such as an application program, that can be executed by the processing component 922. The application program stored in the memory 932 may include one or more modules each corresponding to a set of instructions. In addition, the processing component 922 is configured to execute instructions to execute the above-mentioned method for synchronizing data.

The device 900 may further include a power supply component 926 configured to execute power management of the device 900, a wired or wireless network interface 950 configured to connect the device 900 to a network, and an input/output (I/O) interface 958. The device 900 may operate based on an operating system stored in the memory 932, for example, Windows Server™, Mac OS X™, Unix™, Linux™, FreeBSD™ or the like.

In an example, there is provided a device for transmitting flight information. The device includes:
a processor; and
a memory for storing instructions executable by the processor,
wherein the processor is configured to:
generate handover request related signaling, the handover request related signaling carrying flight path related information of an unmanned aerial vehicle;
and send the handover request related signaling to a target base station.

The processor may be further configured as:
the handover request related signaling includes first handover request signaling;
the operation that the handover request related signaling is sent to the target base station includes that:
the first handover request signaling is sent to the target base station through an X2 interface.

The processor may be further configured as:
an RRC context information element in the first handover request signaling carries flight path related information of an unmanned aerial vehicle.

The processor may be further configured as:
the handover preparation information signaling in the RRC context information element carries flight path related information of an unmanned aerial vehicle.

The processor may be further configured as:
access stratum context signaling in the handover preparation information signaling carries flight path related information of an unmanned aerial vehicle.

The processor may be further configured as:
the handover request related signaling includes handover required signaling;
the operation that the handover request related signaling is sent to the target base station includes that:
sending the handover required signaling to an MME (Mobility Management Entity) through an S1 interface, and instructing the MME to send second handover request signaling to the target base station, the second handover request signaling carrying the flight path related information of the unmanned aerial vehicle.

The processor may be further configured as:
a source to target transparent container information element in the handover required signaling carries flight path related information of an unmanned aerial vehicle.

The processor may be further configured as:
a source to target transparent container information element in the second handover request signaling carries flight path related information of an unmanned aerial vehicle.

The processor may be further configured as:
the handover preparation information signaling in the source to target transparent container information element carries flight path related information of an unmanned aerial vehicle.

The processor may be further configured as:
access stratum context signaling in the handover preparation information signaling carries flight path related information of an unmanned aerial vehicle.

There is provided a computer-readable storage medium. When instructions in the storage medium are executed by a processor of a device, the device can execute the above-mentioned method for transmitting flight information. The method includes:
handover request related signaling is generated, the handover request related signaling carrying flight path related information of an unmanned aerial vehicle; and
the handover request related signaling is sent to a target base station.

The instructions in the storage medium may further include that:
the handover request related signaling includes first handover request signaling;
the operation that the handover request related signaling is sent to the target base station includes that:
the first handover request signaling is sent to the target base station through an X2 interface.

The instructions in the storage medium may further include:
an RRC context information element in the first handover request signaling carries flight path related information of an unmanned aerial vehicle.

The instructions in the storage medium may further include:
the handover preparation information signaling in the RRC context information element carries flight path related information of an unmanned aerial vehicle.

The instructions in the storage medium may further include:
access stratum context signaling in the handover preparation information signaling carries flight path related information of an unmanned aerial vehicle.

The instructions in the storage medium may further include:
the handover request related signaling includes handover required signaling;
the operation that the handover request related signaling is sent to the target base station includes that:
the handover required signaling is sent to an MME through an S1 interface, and the MME is instructed to send second handover request signaling to the target base station, the second handover request signaling carrying the flight path related information of the unmanned aerial vehicle.

The instructions in the storage medium may further include:
a source to target transparent container information element in the handover required signaling carries flight path related information of an unmanned aerial vehicle.

The instructions in the storage medium may further include:

a source to target transparent container information element in the second handover request signaling carries flight path related information of an unmanned aerial vehicle.

The instructions in the storage medium may further include:

the handover preparation information signaling in the source to target transparent container information element carries flight path related information of an unmanned aerial vehicle.

The instructions in the storage medium may further include:

access stratum context signaling in the handover preparation information signaling carries flight path related information of an unmanned aerial vehicle.

In an example, there is provided a device for transmitting flight information. The device includes:

a processor; and a memory for storing instructions executable by the processor, wherein the processor is configured to:

receive handover required signaling sent by a source base station, the handover required signaling carrying flight path related information of an unmanned aerial vehicle; and send second handover request signaling to a target base station, the second handover request signaling carrying the flight path related information of the unmanned aerial vehicle.

The processor may be further configured as:

a source to target transparent container information element in the handover required signaling carries flight path related information of an unmanned aerial vehicle.

The processor may be further configured as:

a source to target transparent container information element in the second handover request signaling carries flight path related information of an unmanned aerial vehicle.

The processor may be further configured as:

the handover preparation information signaling in the source to target transparent container information element carries flight path related information of an unmanned aerial vehicle.

The processor may be further configured as:

access stratum context signaling in the handover preparation information signaling carries flight path related information of an unmanned aerial vehicle.

There is provided a computer-readable storage medium. When instructions in the storage medium are executed by a processor of a device, the device can execute the above-mentioned method for transmitting flight information. The method includes:

handover required signaling sent by a source base station is received, the handover required signaling carrying flight path related information of an unmanned aerial vehicle; and second handover request signaling is sent to a target base station, the second handover request signaling carrying the flight path related information of the unmanned aerial vehicle.

The instructions in the storage medium may further include:

a source to target transparent container information element in the handover required signaling carries flight path related information of an unmanned aerial vehicle.

The instructions in the storage medium may further include:

a source to target transparent container information element in the second handover request signaling carries flight path related information of an unmanned aerial vehicle.

The instructions in the storage medium may further include:

the handover preparation information signaling in the source to target transparent container information element carries flight path related information of an unmanned aerial vehicle.

The instructions in the storage medium may further include:

access stratum context signaling in the handover preparation information signaling carries flight path related information of an unmanned aerial vehicle.

According to a first aspect of the present disclosure, there is provided a method for transmitting flight information. The method includes that:

handover request related signaling is generated, the handover request related signaling carrying flight path related information of an unmanned aerial vehicle; and the handover request related signaling is sent to a target base station.

The technical solution provided by the example of the present disclosure may include the following beneficial effects: the present example provides a feasible solution for transmitting flight information from a source base station to a target base station, which provides a source of flight information for the target base station, and facilitates the target base station to obtain flight information in time.

In one example, the handover request related signaling includes first handover request signaling;

the operation that the handover request related signaling is sent to the target base station includes that:

the first handover request signaling is sent to the target base station through an X2 interface.

The technical solution provided by the example of the present disclosure may include the following beneficial effects: the present example provides a feasible solution for a source base station and a target base station to directly transmit flight information through an X2 interface.

In one example, a Radio Resource Control (RRC) context information element in the first handover request signaling carries the flight path related information of the unmanned aerial vehicle.

The technical solution provided by the example of the present disclosure may include the following beneficial effects: the present example improves the handover request signaling, so that the handover request signaling may carry flight path related information.

In one example, the handover preparation information signaling in the RRC context information element carries the flight path related information of the unmanned aerial vehicle.

The technical solution provided by the example of the present disclosure may include the following beneficial effects: the present example further refines the RRC context information element, and provides a feasible solution for carrying flight path related information.

In one example, access stratum context signaling in the handover preparation information signaling carries the flight path related information of the unmanned aerial vehicle.

The technical solution provided by the example of the present disclosure may include the following beneficial effects: the present example further refines the handover preparation information signaling, and provides a feasible solution for carrying flight path related information.

In one example, the handover request related signaling includes handover required signaling;

the operation that the handover request related signaling is sent to the target base station includes that:

the handover required signaling is sent to a Mobility Management Entity (MME) through an S1 interface, and the MME is instructed to send second handover request signaling to the target base station, the second handover request signaling carrying the flight path related information of the unmanned aerial vehicle.

The technical solution provided by the example of the present disclosure may include the following beneficial effects: the present example provides a solution for indirect transmission of flight information between a source base station and a target base station, and a feasible solution for forwarding flight information by the MME through an S1 interface.

In one example, a source to target transparent container information element in the handover required signaling carries the flight path related information of the unmanned aerial vehicle.

The technical solution provided by the example of the present disclosure may include the following beneficial effects: the present example makes improvements to the handover required signaling, so that the handover required signaling may carry flight path related information.

In one example, a source to target transparent container information element in the second handover request signaling carries the flight path related information of the unmanned aerial vehicle.

The technical solution provided by the example of the present disclosure may include the following beneficial effects: the present example makes improvements to the second handover request signaling, so that the second handover request signaling may carry flight path related information.

In one example, the handover preparation information signaling in the source to target transparent container information element carries the flight path related information of the unmanned aerial vehicle.

The technical solution provided by the example of the present disclosure may include the following beneficial effects: the present example further refines the source to target transparent container information element, and provides a feasible solution for carrying flight path related information.

In one example, access stratum context signaling in the handover preparation information signaling carries the flight path related information of the unmanned aerial vehicle.

The technical solution provided by the example of the present disclosure may include the following beneficial effects: the present example further refines the handover preparation information signaling, and provides a feasible solution for carrying flight path related information.

According to a second aspect of the present disclosure, there is provided a method for transmitting flight information. The method is applied to an MME side, and includes that:

handover required signaling sent by a source base station is received, the handover required signaling carrying flight path related information of an unmanned aerial vehicle; and second handover request signaling is sent to a target base station, the second handover request signaling carrying the flight path related information of the unmanned aerial vehicle.

In one example, a source to target transparent container information element in the handover required signaling carries the flight path related information of the unmanned aerial vehicle.

In one example, a source to target transparent container information element in the second handover request signaling carries the flight path related information of the unmanned aerial vehicle.

In one example, the handover preparation information signaling in the source to target transparent container information element carries the flight path related information of the unmanned aerial vehicle.

In one example, access stratum context signaling in the handover preparation information signaling carries the flight path related information of the unmanned aerial vehicle.

According to a third aspect of the present disclosure, there is provided a device for transmitting flight information. The device is applied to an MME side, and includes: a generating module, configured to generate handover request related signaling, the handover request related signaling carrying flight path related information of an unmanned aerial vehicle; and a sending module, configured to send the handover request related signaling to a target base station.

In one example, the handover request related signaling includes first handover request signaling;

the sending module includes:

a first sending submodule, configured to send the first handover request signaling to the target base station through an X2 interface.

In one example, an RRC context information element in the first handover request signaling carries the flight path related information of the unmanned aerial vehicle.

In one example, the handover preparation information signaling in the RRC context information element carries the flight path related information of the unmanned aerial vehicle.

In one example, access stratum context signaling in the handover preparation information signaling carries the flight path related information of the unmanned aerial vehicle.

In one example, the handover request related signaling includes handover required signaling;

the sending module includes:

a second sending submodule, configured to send the handover required signaling to an MME through an S1 interface, and instruct the MME to send second handover request signaling to the target base station, the second handover request signaling carrying the flight path related information of the unmanned aerial vehicle.

In one example, a source to target transparent container information element in the handover required signaling carries the flight path related information of the unmanned aerial vehicle.

In one example, a source to target transparent container information element in the second handover request signaling carries the flight path related information of the unmanned aerial vehicle.

In one example, the handover preparation information signaling in the source to target transparent container information element carries the flight path related information of the unmanned aerial vehicle.

In one example, access stratum context signaling in the handover preparation information signaling carries the flight path related information of the unmanned aerial vehicle.

According to a fourth aspect of the present disclosure, there is provided a device for transmitting flight information. The device is applied to an MME side, and includes:

a receiving module, configured to receiving handover required signaling sent by a source base station, the handover required signaling carrying flight path related information of an unmanned aerial vehicle; and a sending module, configured to send second handover request signaling to a target base station, the second handover request signaling carrying the flight path related information of the unmanned aerial vehicle.

In one example, a source to target transparent container information element in the handover required signaling carries the flight path related information of the unmanned aerial vehicle.

In one example, a source to target transparent container information element in the second handover request signaling carries the flight path related information of the unmanned aerial vehicle.

In one example, the handover preparation information signaling in the source to target transparent container information element carries the flight path related information of the unmanned aerial vehicle.

In one example, access stratum context signaling in the handover preparation information signaling carries the flight path related information of the unmanned aerial vehicle.

According to a fifth aspect of the present disclosure, there is provided a device for transmitting flight information. The device includes:

a processor; and a memory for storing instructions executable by the processor, wherein the processor is configured to:

generate handover request related signaling, the handover request related signaling carrying flight path related information of an unmanned aerial vehicle; and send the handover request related signaling to a target base station.

According to a sixth aspect of the present disclosure, there is provided a device for transmitting flight information. The device includes:

a processor; and a memory for storing instructions executable by the processor;

wherein the processor is configured to:

receive handover required signaling sent by a source base station, the handover required signaling carrying flight path related information of an unmanned aerial vehicle; and send second handover request signaling to a target base station, the second handover request signaling carrying the flight path related information of the unmanned aerial vehicle.

According to a seventh aspect of the present disclosure, a computer-readable storage medium having stored thereon computer instructions that, when executed by a processor, perform the method of the base station side.

According to an eighth aspect of the present disclosure, a computer-readable storage medium is provided, having stored thereon computer instructions that, when executed by a processor, perform the method of the MME side.

It should be understood that the above general description and the following detailed description are merely exemplary and explanatory, but do not limit the present disclosure.

Other examples of the present disclosure will be apparent to those skilled in the art from consideration of the specification and practice of the present disclosure here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It should be understood that the present disclosure is not limited to the exact construction that has been described above and illustrated in the accompanying drawings, and that various modifications and changes can be made without departing from the scope thereof It is intended that the scope of the present disclosure only be limited by the appended claims.

What is claimed is:

1. A method for transmitting flight information, applied to a source base station, comprising:

generating, at the source base station, handover request related signaling, wherein the handover request related signaling comprises flight path information of an unmanned aerial vehicle; and sending, at the source base station, the handover request related signaling to a target base station, wherein the handover request related signaling comprises handover required signaling, wherein sending, at the source base station, the handover request related signaling to the target base station comprises:

sending, at the source base station, the handover required signaling to a Mobility Management Entity (MME) through an S1 interface; and instructing, at the source base station, the MME to send second handover request signaling to the target base station, wherein the second handover request signaling comprises the flight path information of the unmanned aerial vehicle, wherein a source to target transparent container information element in the handover required signaling carries the flight path information of the unmanned aerial vehicle.

2. The method of claim 1, wherein a source to target transparent container information element in the second handover request signaling carries the flight path information of the unmanned aerial vehicle.

3. The method of claim 1, wherein handover preparation information signaling in the source to target transparent container information element carries the flight path information of the unmanned aerial vehicle.

4. The method of claim 3, wherein access stratum context signaling in the handover preparation information signaling carries the flight path information of the unmanned aerial vehicle.

5. A method for transmitting flight information, applied to an MME, comprising:

receiving, at the MME, handover required signaling sent by a source base station, wherein the handover required signaling comprises flight path information of an unmanned aerial vehicle; and sending, at the MME, second handover request signaling to a target base station, wherein the second handover request signaling comprises the flight path information of the unmanned aerial vehicle, wherein a source to target transparent container information element in the handover required signaling carries the flight path information of the unmanned aerial vehicle.

6. The method of claim 5, wherein the source to target transparent container information element in the second handover request signaling carries the flight path information of the unmanned aerial vehicle.

7. The method of claim 5, wherein handover preparation information signaling in the source to target transparent container information element carries the flight path information of the unmanned aerial vehicle.

8. The method of claim 7, wherein access stratum context signaling in the handover preparation information signaling carries the flight path information of the unmanned aerial vehicle.

9. A device for transmitting flight information, comprising:
a processor; and
a memory for storing instructions executable by the processor;
wherein the processor is configured to:
generate handover request related signaling, wherein the handover request related signaling comprises flight path information of an unmanned aerial vehicle; and
send the handover request related signaling to a target base station;
wherein the handover request related signaling comprises handover required signaling,
wherein the processor is further configured to:
send the handover required signaling to a Mobility Management Entity (MME) through an S1 interface, and instruct the MME to send second handover request signaling to the target base station, the second handover request signaling carrying the flight path related information of the unmanned aerial vehicle,
wherein a source to target transparent container information element in the handover required signaling carries the flight path related information of the unmanned aerial vehicle.

10. A device for transmitting flight information, applied to an MME, comprising:
a processor; and
a memory for storing instructions executable by the processor;
wherein the processor is configured to execute the method for transmitting flight information of claim 5.

* * * * *